United States Patent [19]
Behrmann et al.

[11] Patent Number: 5,866,621
[45] Date of Patent: Feb. 2, 1999

[54] GAS AND SOLIDS REDUCING SLURRY DOWNCOMER

[75] Inventors: William C. Behrmann, Baton Rouge, La.; Charles J. Mart, Coppell, Tex.

[73] Assignee: Exxon Research and Engineering Company, Florham Park, N.J.

[21] Appl. No.: 851,863

[22] Filed: May 6, 1997

[51] Int. Cl.[6] .............................. C07C 27/00; B81J 20/34
[52] U.S. Cl. ...................... 518/706; 518/700; 518/715; 502/21
[58] Field of Search .................................. 518/706, 700, 518/715; 502/21

[56] References Cited

U.S. PATENT DOCUMENTS

| | | | |
|---|---|---|---|
| 5,260,239 | 11/1993 | Hsia | 502/30 |
| 5,268,344 | 12/1993 | Pedrick et al. | 502/30 |
| 5,283,216 | 2/1994 | Mitchell | 502/30 |
| 5,332,552 | 7/1994 | Chang | 422/140 |
| 5,382,748 | 1/1995 | Behrmann et al. | 585/899 |
| 5,422,375 | 6/1995 | Rytter et al. | 518/700 |
| 5,520,890 | 5/1996 | Lorentzen et al. | 422/197 |

*Primary Examiner*—Gary Geist
*Assistant Examiner*—J. Parsa
*Attorney, Agent, or Firm*—Jay Simon

[57] ABSTRACT

Particulate solids and gas are removed from a three phase hydrocarbon synthesis slurry of solid catalyst particles, gas and liquid, by successively passing slurry from a slurry body through solids and gas disengaging zones in fluid communication, with the solids disengaging zone upstream of the gas disengaging zone. This is accomplished using a solids and gas disengaging downcomer immersed in the slurry wherein solids are disengaged in a quiescent zone adjacent the slurry body, from which the solids reduced slurry passes through an enclosed cup in which gas is disengaged and removed. The bottom of the cup terminates in a downwardly depending downcomer which hydraulically feeds the densified, solids and gas reduced slurry to the bottom of the reactor or to filtration.

25 Claims, 2 Drawing Sheets

GAS AND SOLIDS REDUCING SLURRY DOWNCOMER

BACKGROUND OF THE DISCLOSURE

1. Field of the Invention

The invention relates to a solids reducing downcomer. More particularly, the invention relates to a downcomer for producing a gas and solids reduced slurry from a three phase hydrocarbon synthesis slurry comprising gas bubbles and particulate catalyst solids dispersed in a hydrocarbon liquid.

2. Background of the Invention

Slurry hydrocarbon synthesis (HCS) processes are known. In a slurry HCS process a synthesis gas (syngas) comprising a mixture of $H_2$ and CO is bubbled up as a third phase through a slurry in a reactor in which the slurry liquid comprises hydrocarbon products of the synthesis reaction and the dispersed, suspended solids comprise a suitable Fischer-Tropsch type hydrocarbon synthesis catalyst. Reactors which contain such a three phase slurry are sometimes referred to as "bubble columns", as is disclosed in U.S. Pat. No. 5,348,982. Irrespective of whether the slurry reactor is operated as a dispersed or slumped bed, the mixing conditions in the slurry will typically be somewhere between the two theoretical conditions of plug flow and back mixed. The catalyst particles are typically kept dispersed and suspended in the liquid by the lifting action of the syngas bubbling up through the slurry and by hydraulic means. Mechanical means such as impellers and propellers and the like are not used, because they will quickly erode and also cause attrition of the catalyst particles. One or more vertical, gas disengaging downcomers may be used as hydraulic means to assist in maintaining more uniform catalyst dispersion, by providing a vertical catalyst circulation in the slurry, as is disclosed in U.S. Pat. No. 5,382,748. The catalyst particles, being heavier than the liquid, tend be more concentrated at the bottom of the slurry. It would therefore be advantageous in maintaining a more uniform vertical catalyst concentration to circulate a catalyst lean slurry to the bottom. Further, the slurry liquid hydrocarbon product of the HCS reaction must be separated from the catalyst particles. This is typically accomplished by mechanical filtration in which the slurry is fed to one or more porous filter media which permit the liquid to pass through, but not the catalyst particles. The hydrocarbon liquid filtrate is then sent to further processing and upgrading. The build-up of a catalyst particle cake and plugging of the filters could be reduced if some of the catalyst particles were removed from the slurry before it is filtered. Hence, there is a need for a means of reducing the catalyst concentration in slurry being fed to the bottom of the reactor and to filtration.

SUMMARY OF THE INVENTION

The invention relates to a method and means for reducing solids and gas in a three phase slurry and is useful in a hydrocarbon synthesis (HCS) process. The slurry comprises gas bubbles and particulate solids in a slurry liquid. The means comprises solids and gas disengaging zones, and a slurry conduit. The method comprises passing the slurry through the solids and gas disengaging zones to form a solids and gas reduced slurry, which is then passed to a desired location by means of a fluid conduit, such as a downcomer. By gas and solids reduced slurry is meant a slurry that has been reduced in both gas bubbles and particulate solids. This invention is useful for removing gas bubbles and catalyst particles from an HCS slurry being fed to the bottom of the slurry body to improve vertical catalyst distribution, and to slurry filtration for recovering the slurry liquid produced by the HCS reaction. In one embodiment, the process of the invention is achieved by means which comprises a solids and gas reducing slurry downcomer having solids and gas disengaging zones. The slurry solids and gas reducing means, which comprise solids and gas disengaging zones, are located proximate the downcomer entrance and are immersed in a slurry body. The solids disengaging zone is in fluid communication with the slurry body which surrounds it and with an interior gas disengaging zone. Slurry from the slurry body passes through the solids disengaging zone, in which particulate solids and gas are disengaged to form a solids reduced slurry, which is then passed through a gas disengaging zone in which more gas is disengaged to form a solids and gas reduced slurry. The solids and gas reduced slurry is then passed into a fluid transfer conduit, such as a downcomer, which feeds the slurry to the desired location. When the desired location is lower than the fluid conduit entrance, slurry from the slurry body continuously passes into and through the solids and gas reducing downcomer hydraulically, due to the higher density of the slurry in the downcomer compared to that of the surrounding slurry body. Thus, slurry circulation through the downcomer is achieved hydraulically. This may be achieved with a downcomer having a solids and gas reducing means proximate its entrance which comprises an external slurry solids disengaging zone in fluid communication with an internal gas disengaging zone, to produce a solids and gas depleted slurry, which is fed into a slurry transfer conduit, or downcomer tube, in fluid communication with the gas disengaging zone. An illustrative example of a suitable downcomer means useful in the practice of the invention includes a hollow, enclosed cup having a sloping top and bottom which define and enclose an internal slurry gas disengaging zone within. The top contains a hollow slurry inlet tube or conduit for passing slurry from the solids disengaging zone into the interior gas disengaging zone. A gas releasing means, such as a hollow conduit in fluid communication with the interior gas disengaging zone, extends upward from the apex of the sloping top. A downward concave or frustoconical shaped baffle, open at its apex on the top, is positioned over the open top of the inlet conduit and the sloping top of the cup as a cap. The baffle extends outward and down to terminate in an outer periphery substantially the same size and shape as the outer periphery of the cup. The bottom of the cup contains an orifice from which depends the downcomer tube or fluid conduit. An annular solids disengaging zone exterior of the cup is defined by the cap at the top, the sloped upper cup wall at the bottom, with the outer surface of the inlet conduit defining the inside of the annular zone. The outer periphery of the solids disengaging zone is either completely open to the surrounding slurry body in which it is immersed or it contains baffles (such as louvers) which permit the surrounding slurry to pass into the zone while protecting the zone from being disturbed by turbulence in the slurry body. In further embodiments the interior of the gas disengaging zone contains one or more baffles to improve release of the gas bubbles by the downflowing slurry and may also contain turbulence and vortex reducing means in the inlet tube and proximate the bottom orifice, respectively.

With specific regard to a slurry HCS process for forming hydrocarbons, at least a portion of which are liquid, the invention comprises the steps of:

(a) contacting a synthesis gas (syngas) comprising a mixture of $H_2$ and CO with a solid, particulate hydrocarbon synthesis catalyst in a slurry comprising said catalyst, hydrocarbon slurry liquid and gas bubbles under conditions effective to form hydrocarbons from the syngas, wherein the hydrocarbon slurry liquid comprises hydrocarbon products which are liquid at the reaction conditions;

(b) passing a portion of the slurry into a solids disengaging zone to remove at least a portion of the solids and form a solids reduced slurry;

(c) passing the solids reduced slurry into a gas disengaging zone to disengage at least a portion of the gas bubbles and form a gas and solids reduced slurry, and (d) passing the solids and gas reduced slurry into a fluid conduit by which it is passed to the desired location.

The slurry or slurry body from which a portion is passed into the solids and gas disengaging zones may be the reactive slurry in the HCS reactor or it may be a slurry body in an external rejuvenation or filtration zone. The fluid conduit may be a downcomer which passes the solids and gas reduced slurry down to the bottom of the reactive HCS slurry in an HCS reactor to improve vertical catalyst distribution in the reactor. In another embodiment, the downcomer will pass the solids and gas reduced slurry to a filtration zone in which the valuable liquid hydrocarbon products of the HCS reaction are separated from the catalyst particles and sent to further processing and upgrading. Reducing the solids content of slurry sent to filtration reduces the buildup of catalyst cake on the filter. During operation of the slurry solids and gas reducing downcomer, the HCS reactor may be operating or it may be shut down. If it is operating, the presence of the downcomer in the reactive HCS slurry does not disturb the HCS reaction. When the process and means of the invention is used to improve the vertical catalyst concentration in a slurry reactor, the vertical temperature profile in the reactor is more uniform. This reduces hot spots and their concomitant lower selectivity to the more desired liquid hydrocarbon products. The reduction of hot spots also reduces catalyst deactivation. Catalyst deactivation increases selectivity to lower molecular weight products because of the lower CO concentration achieved if the temperature is held constant, or because of the higher temperature needed to maintain the conversion constant. Consequently, hot spot reduction helps to maintain high CO conversion and selectivity to higher molecular weight products. A high catalyst concentration proximate the bottom of the reactor makes it more difficult to remove the exothermic heat of the HCS reaction, since the space available for heat exchangers is severely limited. This can result in the entire lower portion of the reactor running too hot, or the rest of the reactor running too cool to avoid heat build-up at the bottom. The invention reduces this by sending a catalyst reduced slurry to the bottom. While the process and means of the invention are described herein with particular reference to their usefulness in association with a slurry HCS process, the invention is not intended to be so limited. Thus, the invention may be practiced with other types of slurries and chemical processes, including biological and waste water treatment processes.

DETAILED DESCRIPTION

The advantages of the practice of the invention to achieve more uniform vertical catalyst distribution in an HCS slurry reactor have been stated above. The prior art disclosed in U.S. Pat. No. 5,382,748 teaches that HCS slurry reactors may have one or more vertical, gas disengaging downcomers for minimizing catalyst maldistribution in the reactive slurry, by hydraulically setting up slurry circulation from the upper portion of the slurry where the catalyst concentration is least, to the bottom of the slurry where it is greatest. However, unlike the downcomer of the invention, these prior art downcomers do not reduce the solids content of the slurry before it is passed to the bottom of the reactor.

Figure 1:
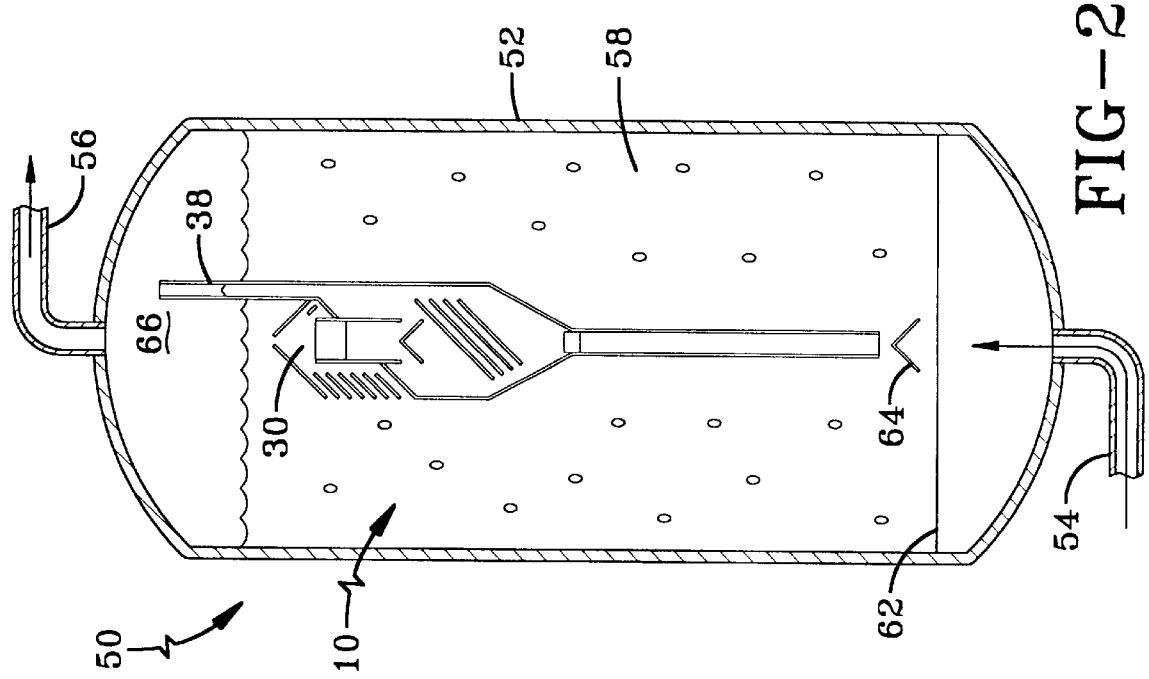
FIG. 1 schematically illustrates a solids reducing downcomer of the invention.
Figure 2:
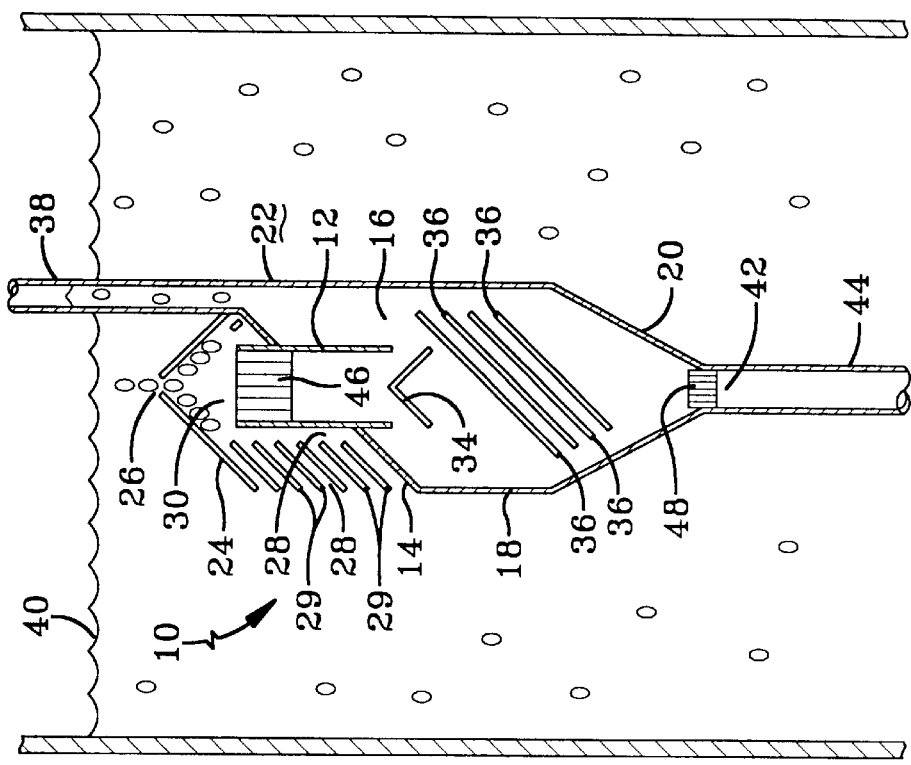
FIG. 2 is a schematic illustration of a slurry type hydrocarbon synthesis reactor containing a solids reducing downcomer of the invention.

FIG. 1 illustrates a cross sectional schematic of an embodiment of a gas and solids reducing downcomer 10 of the invention comprising a slurry inlet 12 in the form of a hollow pipe open at both ends and which extends above and below the upper wall 14 of the internal gas disengaging zone 16, which is defined by a vertical cylindrical outer wall 18, a sloping upper wall 14 and sloping bottom 20, of the gas disengaging cup 22. A cone shaped cap 24, having an orifice 26 at its apex, is disposed over the upper end of inlet 12, with its external edge having the same diameter as that of the outer wall 18. Space 28 is a solids and gas disengaging zone external of gas disengaging zone 16 and is defined by the outer surface of the slurry inlet 12, the cap 24 and the sloping top 14 of the gas disengaging cup 22. The outer wall 18 of the gas disengaging cup prevents uprising gas bubbles in the three phase slurry surrounding the downcomer, which are briefly and simply illustrated by the small circles, from passing up into the solids and gas disengaging zone 28. Thus, space 28 is a quiescent zone which the uprising gas bubbles in the surrounding slurry do not enter. Since not many of the uprising gas bubbles enter this zone, catalyst particles drop out of the slurry. In the embodiment illustrated in the Figures, a plurality of sloping baffles 29 are illustrated in the outer peripheral portion of zone 28. In FIGS. 1 and 2 these appear as slats or louvers for the sake of simplicity, since these are two dimensional drawings. They are intended to be in the form of hollow cone-shaped (hollow frustoms angularly truncated at the bottom) baffles of metal or other suitable material which reduce turbulence in the surrounding slurry body from entering quiescent zone 28. The angle of slope of these is the same as that of 14 and 24. If these baffles were not present, the catalyst particles would all fall to the bottom of zone 28, roll down the sloping top 14 of the cup, and exit the zone at the outer periphery of the cup and fall back into the surrounding slurry. In the embodiment shown, some of the catalyst particles drop onto the baffle 29 below and then back out into the slurry body, while some disengage and drop out further in zone 28, past the baffles and nearer to conduit 12, falling down onto 14 and then out of zone 28. The slope of baffles 29 and top 14 is greater than the angle of friction of the disengaged catalyst particles, so that they continue down the baffles and wall 14 and back out into the surrounding slurry, leaving a solids reduced slurry in zone 28 which passes up through space 30, over the top of the slurry inlet, down through the inlet and into internal gas disengaging zone 16. At the same time, a portion of the gas bubbles in the slurry in zone 28 are also disengaged and pass up under cap 24 and out the orifice 26 where they pass into slurry above the downcomer. In another embodiment (not shown), the baffles could comprise laterally spaced apart, vertical metal strips circumferentially arranged around the outer periphery of 28, with a similar array slightly radially inward in which the inner strips are radially downstream of the spaces in the outer strips. The small circles under the cap and just above its orifice represent uprising bubbles of gas disengaged from the slurry in zone 28. Thus, the slurry passing into the interior gas disengaging zone is reduced in both gas and solids content. A simple internal baffle plate 34, which in this embodiment is cone shaped, below the bottom of the slurry inlet conduit minimizes disturbance of the gas disengaging slurry below by the downflowing slurry exiting the conduit. It is preferred that the horizontal cross sectional area of the internal gas disengaging zone is sized so as to be large enough to lower the velocity of the downflowing liquid to below the rise velocity of the gas bubbles being disengaged from the slurry. One or more sloped or diagonal baffles or baffle plates 36 may be employed in the internal gas disengaging zone to further reduce turbulence and mixing in zone 16, thereby permitting more gas disengagement. Also shown are turbulence and vortex reducing means 46 and 48, respectively, both of which are illustrated as simple grids of intersecting vertical strips. These are also shown in partial perspective in FIG. 3. Turbulence reducing means 46 reduces the amount of turbulence that might otherwise enter into the quiescent gas disengaging zone 16 below. Means 48 prevents vortexes from forming in the entrance to the downcomer conduit. A hollow cylindrical chimney 38, open at both ends, extends up from the upper edge apex of sloped cup top 14 and out the top 40 of the slurry body to release the disengaged gas bubbles above the slurry. If desired, the top of the chimney may exit into the slurry body. In a slurry hydrocarbon synthesis reactor, the gas bubbles closer to the top of the slurry comprise substantially more reaction products than synthesis gas. Therefore, it is best not to reintroduce the gas back into the reactive slurry. Even though this may not be the case for all slurry type reactions, it is still advantageous to the operation of the gas and solids reducing downcomer not to permit slurry turbulence to be introduced into the gas disengaging zone. The sloping angle of the baffle plates 36 and also of the sloping bottom 20 of the internal gas disengaging cup are greater than the angle of repose of the catalyst particles and/or other solids in the slurry, so that disengaged particles do not build up on either the baffles or at the bottom of the cup. The gas and solids reduced slurry passes down the internal gas disengaging zone 16, through the opening or orifice 42 and into downcomer tube 44 depending vertically downward from the bottom of cup 22. Studies were made for a 3 inch downcomer of the prior art having a 2 foot diameter gas disengaging cup at the top. Immersed in an HCS slurry comprising 60 volume % gas bubbles, the slurry flowing down through the downcomer would have a gas bubble concentration of only 20–40% and the hydraulic velocity of the slurry flowing down through the downcomer would be from 8–16 feet/second. In an HCS slurry reactor, the volumetric concentration of the gas bubbles in the slurry may range from about 10 to 80%, and more typically from 30 to 65%. The catalyst particles may be present in an amount of from about 10–70 wt. %, more typically from 30–60 wt. % and, in some embodiments, 40–55 wt. %. The catalyst particle size will range from about 1–200 microns, more typically from 5–150 microns and, in some embodiments, from about 10–80 microns. The downcomer tube directs the solids and gas reduced slurry to another portion of the surrounding reactor slurry, such as to the bottom where the catalyst concentration is greatest, to reduce catalyst maldistribution in the slurry and to hydraulically set up vertical circulation in the slurry. Alternatively, the downcomer tube may direct the solids and gas reduced slurry to a filtration zone in which the slurry liquid is separated from the other slurry components by filtration and sent to further processing. It is desired that slurry being filtered to remove the liquid from the solids and gas bubbles, contain as little of these other components as possible, to avoid plugging the filter with the solids and passing gas through the filter with the liquid, to achieve the greatest possible liquid throughput through the filter.

Figures 3, 4:
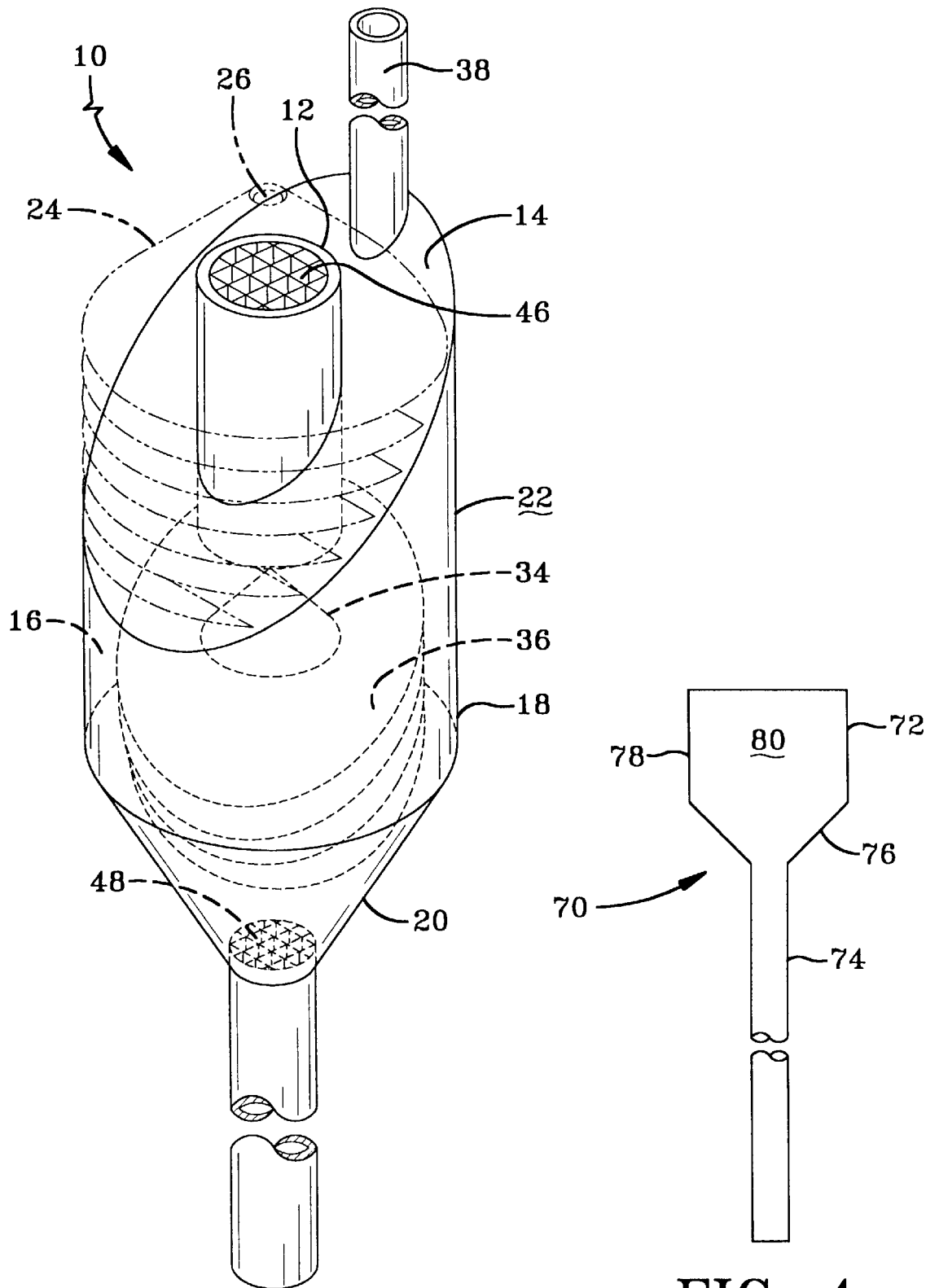
FIG. 3 is a perspective view of part of the downcomer of FIGS. 1 and 2.
FIG. 4 is a brief schematic of a gas disengaging downcomer of the prior art.

FIG. 2 is a schematic briefly illustrating a slurry type hydrocarbon synthesis reactor containing a solids and gas reducing downcomer of the invention. While one or more will be employed, only one is shown for convenience. Turning to FIG. 2, reactor 50 comprises an outer shell 52 containing a three phase reactive HCS slurry 58 within. A synthesis gas is injected into the bottom of the reactor via gas line 54, while product gas is removed overhead via line 56. The synthesis feed gas is injected up through the slurry through suitable gas distribution means arranged across the surface of an otherwise gas and liquid impermeable tray 62. Not shown is filtration means, such as one or more liquid filters in the reactive slurry 14 or in one or more filtration vessels external of the reactor. Such filtration means separate the hydrocarbon slurry liquid from the catalyst particles as filtrate, and pass the filtrate to further processing and upgrading. Magnetic means may also be used to separate the catalyst particles from the hydrocarbon liquid product if the catalyst particles are magnetic or paramagnetic, as is disclosed in the prior art. A solids and gas reducing downcomer of the invention 10 is shown immersed within the slurry 58, except for the gas releasing upper portion of the gas chimney 38 which extends up through the top of the slurry and into the gas disengaging and collecting space 66 at the top of the reactor. A cone shaped baffle 64 below the bottom of the downcomer prevents uprising synthesis gas bubbles, indicated as small circles, from entering into the downcomer and impairing its effectiveness. The downcomer hydraulically pumps a solids and gas reduced slurry down to the bottom of the reactor to improve the vertical catalyst. FIG. 3 is a partial perspective of part of the downcomer of the invention illustrated in FIGS. 1 and 2, in which baffle plates 29 and 36 are shown in phantom and in which the turbulence and vortex reducers 46 and 48 are partially shown in perspective. The upward slope of the upper wall 14 insures that gas disengaged from the slurry disengaging zone passes up and into the chimney located at its apex and is removed from the internal gas disengaging zone.

In contrast to the solids reducing downcomer of the invention, FIG. 4 schematically illustrates a downcomer of the prior art, of the type disclosed and claimed in U.S. Pat. No. 5,382,748. Thus, downcomer 70 comprises an upwardly open gas disengaging and solids increasing cup 72, having a sloping bottom 76 which terminates in a downwardly extending, hollow downcomer tube 74. The cylindrical side wall 78 and bottom 76 of the cup define a gas disengaging zone 80 within. The bottom and side wall prevent uprising gas bubbles from entering into and contacting slurry in zone 80 in the interior cavity of the open cup. This creates a quiescent zone in which gas bubbles are released from the slurry and not replaced and, at the same time, suspended solids fall down into the bottom of the cup, since there are no uprising gas bubbles to keep the solids in suspension. The solids are denser than the slurry liquid. The horizontal cross section of the interior of the downcomer tube is smaller than that of the cup. It has recently been found that this type of downcomer can increase the solids (catalyst) concentration in the slurry passing down the downcomer tube, so that it is greater than that in the surrounding reactor slurry from which it is withdrawn.

Except for the embodiment in which a gas releasing chimney and downcomer for passing the solids reduced slurry pass out of the slurry, the downcomer is fully immersed in the main slurry body, whether it be the reactive slurry in the reactor or a slurry body in another vessel. In the embodiment in which the downcomer is immersed in the reactive slurry in an HCS slurry reactor for reducing catalyst maldistribution, the bottom of the slurry outlet conduit or downcomer tube is near the bottom of the slurry, but at a sufficient distance above the bottom to prevent accumulation on top of the tray at the bottom of the reaction zone, of the catalyst particles exiting the downcomer and distributed by the baffle. The slurry exits the downcomer preferably proximate a point over a gas distributor in the bottom of the tray, so that the falling catalyst particles are immediately contacted by uprising syngas bubbles to lift them up and improve mass transfer between the gas and the catalyst.

In an HCS process, liquid and gaseous hydrocarbon products are formed by contacting a syngas comprising a mixture of $H_2$ and CO with a suitable Fischer-Tropsch type HCS catalyst, under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg, and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

The hydrocarbons produced by an HCS process according to the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A slurry hydrocarbon synthesis process for forming hydrocarbons comprising:

(a) contacting a synthesis gas comprising a mixture of $H_2$ and CO with a solid, particulate hydrocarbon synthesis catalyst in a slurry body which comprises said catalyst, hydrocarbon slurry liquid and gas bubbles, under reaction conditions effective to form said hydrocarbons from said synthesis gas, at least a portion of which are liquid at said reaction conditions;

(b) passing a portion of said slurry from said slurry body through a solids and gas disengaging zone of a solids and gas reducing downcomer means to remove a portion of said particulate catalyst and gas bubbles to form a solids and gas reduced slurry;

(c) passing said solids and gas reduced slurry through a gas disengaging zone of said downcomer means to disengage additional gas bubbles and form a second gas and solids reduced slurry, and (d) passing said second solids and gas reduced slurry down into a fluid transfer conduit of said downcomer means by which it is passed to a desired location, wherein both said zones are in fluid communication, wherein said solids and gas disengaging zone is upstream of said gas disengaging zone and has a substantially vertically open outer periphery in direct contact with said slurry body, wherein said fluid transfer conduit depends from gas disengaging zone, and wherein said gas disengaging zone is within an enclosure and not in direct contact with said slurry body.

2. A process according to claim 1 wherein said solids and gas reduced slurry is passed to the lower portion of said slurry body.

3. A process according to claim 1 wherein said zones and at least a portion of said conduit are immersed in said slurry body.

4. A process according to claim 1 wherein said catalyst comprises at least one supported Group VIII metal.

5. A process according to claim 4 wherein at least a portion of said synthesized hydrocarbons ate upgraded by fractionation and/or one or more conversion operations.

6. A process according to claim 4 wherein a portion of said solids and gas reduced slurry is passed to a filtration zone in which said liquid is separated from said solids.

7. A process according to claim 1 wherein said solids and gas disengaging zones are immersed in said slurry body.

8. A process according to claim 7 wherein at least a portion of said fluid transfer conduit depends vertically downward.

9. A process according to claim 8 wherein said solids and gas disengaging downcomer comprises a hollow, enclosed cup having a sloping top and bottom which define and enclose said slurry gas disengaging zone, with said top containing a hollow slurry inlet conduit and a hollow gas releasing conduit extending up from said top in fluid communication with said zone, wherein a downward concave baffle open at its top apex is positioned over said inlet and a downcomer conduit in fluid communication with said zone extends down from said zone, and with said solids and gas disengaging zone in fluid communication with said inlet and annularly surrounding said cup.

10. A process for forming a solids and gas reduced slurry from a three phase slurry body comprising gas bubbles and particulate solids in a slurry liquid comprises:

(a) passing a portion of said slurry from said body through a solids disengaging zone of a solids and gas reducing downcomer means to remove a portion of said particulate solids to form a solids reduced slurry;

(b) passing said solids reduced slurry through a gas disengaging zone of said downcomer means to disengage gas bubbles and form a gas and solids reduced slurry, and (c) passing said gas and solids reduced slurry down into a fluid transfer conduit of said downcomer means to pass said gas and solids reduced slurry to a desired location, wherein both said zones are in fluid communication, wherein said solids disengaging zone is upstream of said gas disengaging zone and has a substantially vertically open outer periphery in direct contact with said slurry body, wherein said fluid transfer conduit depends from gas disengaging zone, and wherein said gas disengaging zone is within an enclosure and not in direct contact with said slurry body.

11. A process according to claim 10 wherein said solids and gas disengaging zones, and at least a portion of said conduit, are immersed in said slurry body.

12. A process according to claim 11 wherein said solids and gas reduced slurry is passed to the lower portion of said slurry body.

13. A process according to claim 11 wherein a portion of said solids and gas reduced slurry is passed to a filtration zone in which said liquid is separated from said solids.

14. A process according to claim 12 wherein said fluid transfer conduit depends vertically downward from said gas disengaging zone.

15. A process according to claim 10 wherein said solids and gas disengaging downcomer comprises a hollow, enclosed cup having a sloping top and bottom which define and enclose said slurry gas disengaging zone, with said top containing a hollow slurry inlet conduit and a hollow gas releasing conduit extending up from said top in fluid communication with said zone, wherein a downward concave baffle open at its top apex is positioned over said inlet and a downcomer conduit in fluid communication with said zone extends down from said zone, and with said solids disengaging zone in fluid communication with said inlet and annularly surrounding said cup.

16. A process according to claim 15 wherein said solids disengaging zone also disengages gas from said slurry.

17. A slurry hydrocarbon synthesis process in which $H_2$ and CO are reacted to form hydrocarbons in a slurry comprising gas bubbles and solid catalyst particles in a hydrocarbon slurry liquid, said process further comprising:

(a) passing a portion of said slurry through a solids and gas disengaging zone of a solids and gas reducing downcomer to remove a portion of said slurry solids and gas and form a first solids and gas reduced slurry, wherein said downcomer comprises (i) a gas disengaging zone not in direct contact with said slurry, (ii) said solids and gas disengaging zone upstream of, and in fluid communication with, said gas disengaging zone, and (iii) a hollow downcomer conduit depending downwardly from said gas disengaging zone, wherein said solids and gas disengaging zone annularly surrounds at least a portion of said gas disengaging zone and has a substantially vertically open outer periphery in direct contact with said reactive slurry;

(b) passing said first solids and gas reduced slurry through said gas disengaging zone to disengage gas and form a second solids and reduced slurry, and (c) passing said second solids and gas reduced slurry down into said downcomer conduit and to a desired location.

18. A process according to claim 17 wherein both said zones and at least a portion of said downcomer conduit are located within said slurry.

19. A process according to claim 18 wherein said slurry is in a hydrocarbon synthesis reactor.

20. The process of claim 5 wherein the upgrading comprises non-catalytic conversion.

21. The process of claim 20 wherein the conversion is steam cracking.

22. The process of claim 20 wherein the upgrading comprises catalytic conversion.

23. The process of claim 22 wherein the catalytic conversion is effected in the presence of hydrogen.

24. The process of claim 23 wherein the catalytic conversion comprises hydroisomerization.

25. The process of claim 24 wherein diesel fuel is produced.

* * * * *